Sept. 16, 1930.　　　A. W. CAPS　　　1,775,630
INDICATOR FOR PHOTOGRAPHIC APPARATUS
Filed July 2, 1928　　　3 Sheets-Sheet 1
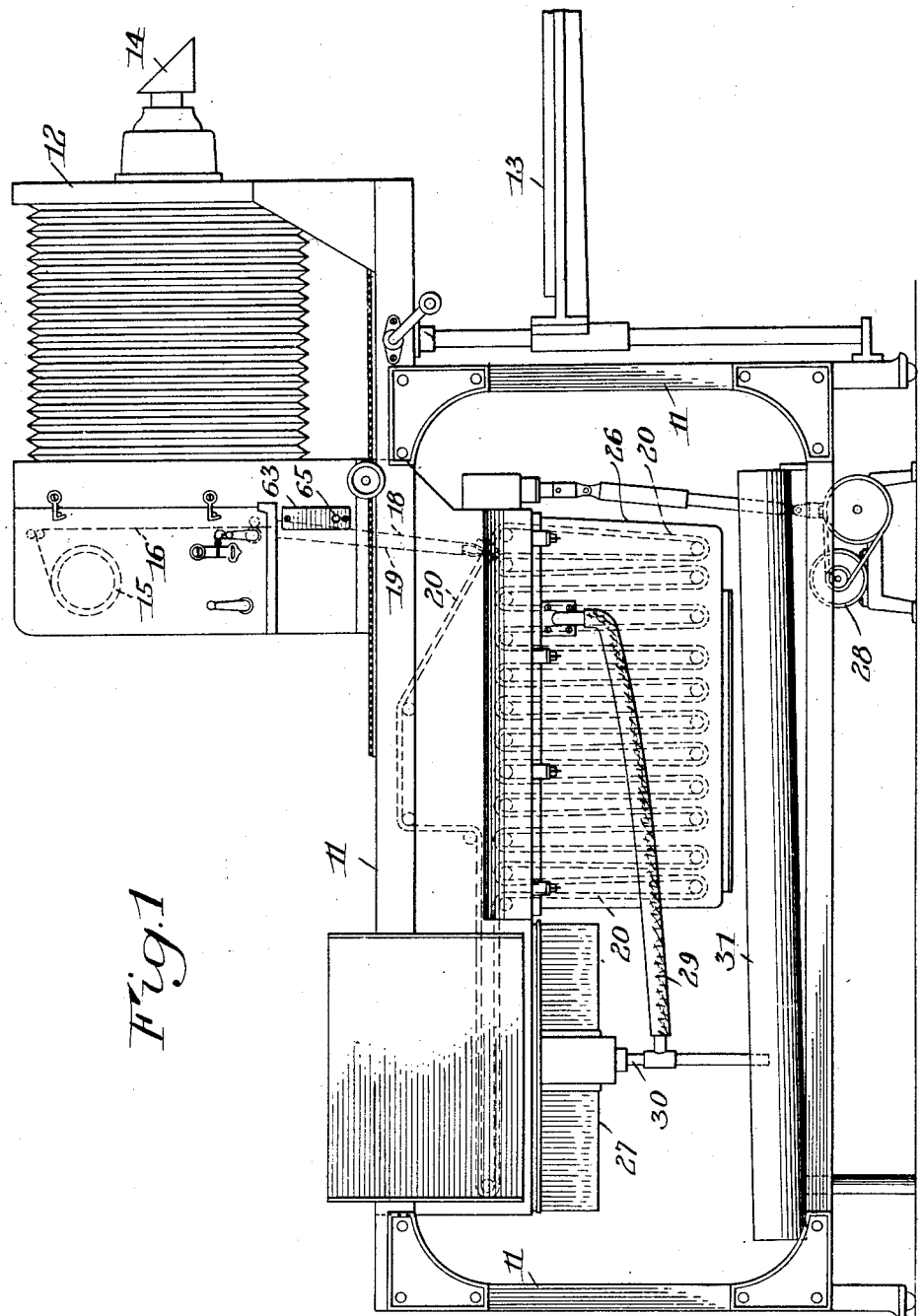
INVENTOR
Arthur W. Caps
BY
his ATTORNEYS Sept. 16, 1930.  A. W. CAPS  1,775,630
INDICATOR FOR PHOTOGRAPHIC APPARATUS
Filed July 2, 1928  3 Sheets-Sheet 2
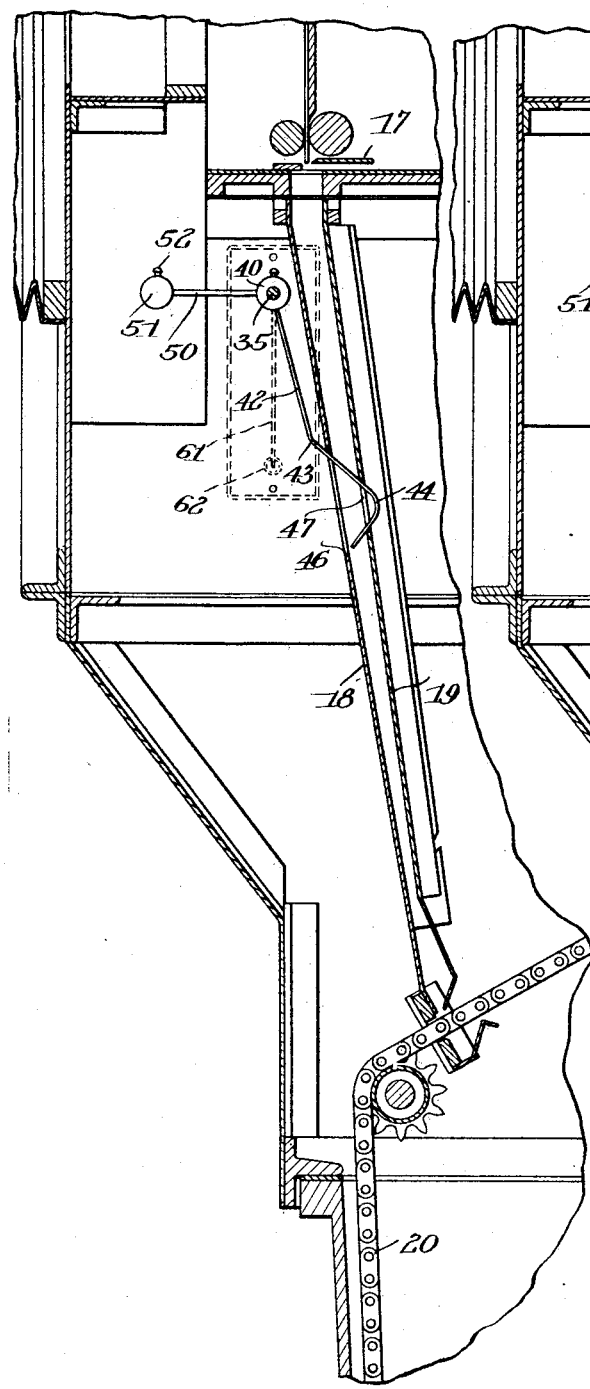
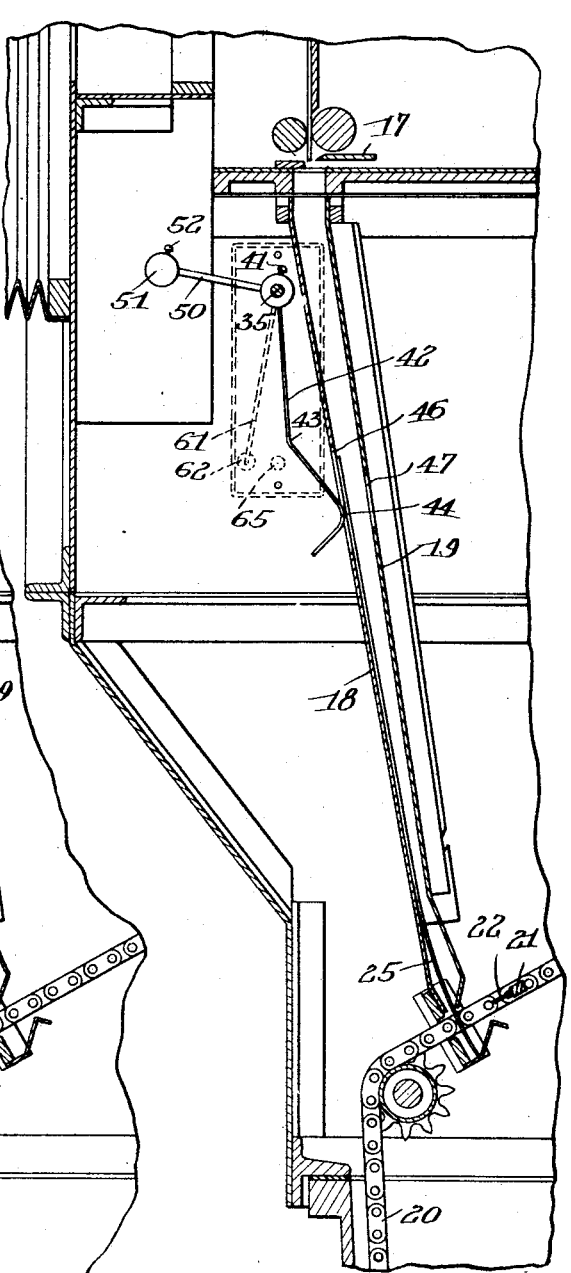
INVENTOR
Arthur W. Caps
BY
his ATTORNEYS Sept. 16, 1930. A. W. CAPS 1,775,630
INDICATOR FOR PHOTOGRAPHIC APPARATUS
Filed July 2, 1928 3 Sheets-Sheet 3
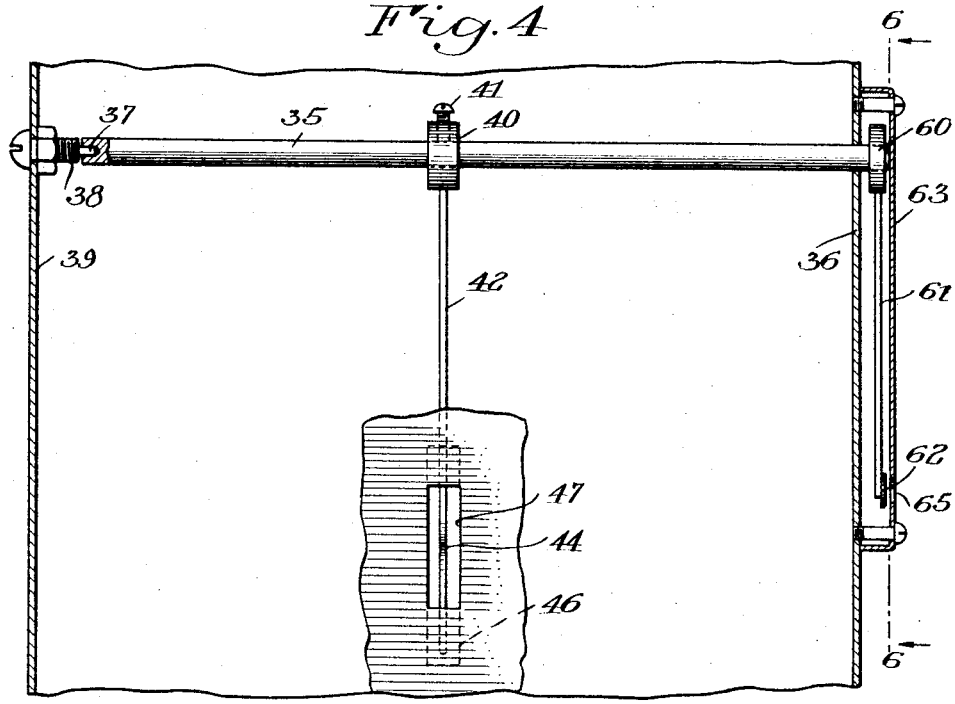
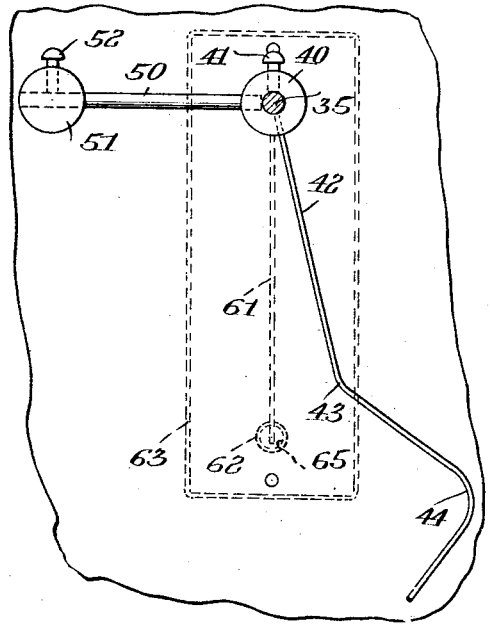 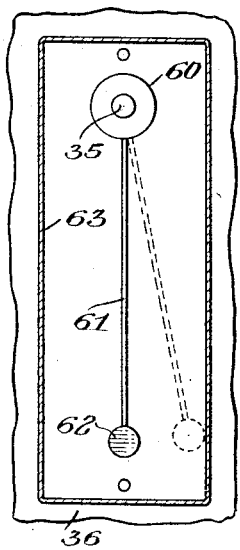 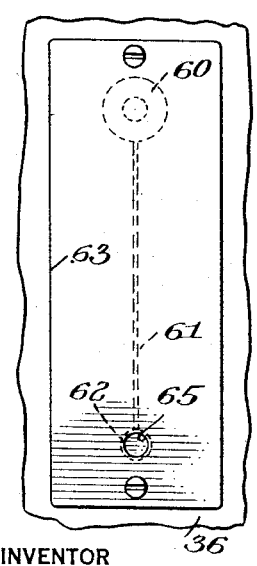
INVENTOR
Arthur W. Caps
BY
his ATTORNEYS Patented Sept. 16, 1930

1,775,630

UNITED STATES PATENT OFFICE

ARTHUR W. CAPS, OF ROCHESTER, NEW YORK, ASSIGNOR TO PHOTOSTAT CORPORATION, OF PROVIDENCE, RHODE ISLAND, A CORPORATION OF RHODE ISLAND

INDICATOR FOR PHOTOGRAPHIC APPARATUS

Application filed July 2, 1928. Serial No. 289,760.

This invention relates to an indicator for use on photographic apparatus, and has for its principal object the provision of an efficient and satisfactory indicator which will show the operator whether or not a piece of sheet material is in predetermined position.

Another object of the invention is the provision of an indicator so designed and constructed as to prevent leakage of light into the chamber holding the sensitized sheet material, while permitting the indicator to be observed from a point outside of the chamber.

A further object is the provision of an indicating device for showing when the supply of sensitized sheet material is exhausted.

It is an additional object of the invention to provide means for indicating whether a sheet is in position to be picked up by conveying means, and thus to warn the operator not to place a second sheet in pick-up position before the previous sheet has been picked up.

To these and other ends the invention resides in certain improvements and combinations of parts, all as will be hereinafter more fully described, the novel features being pointed out in the claims at the end of the specification.

In the drawings:

Fig. 1 is a side elevation of one form of photographic apparatus with which the invention may be used, showing parts of the invention applied thereto;

Fig. 2 is a vertical sectional view through a part of the apparatus showing the indicating means in the position which it assumes when there is no sheet material in the sheet holding means or chute;

Fig. 3 is a view similar to Fig. 2 showing the indicating means in the position which it assumes when a sheet is present in the holding means;

Fig. 4 is a transverse vertical section through a part of the apparatus showing the indicating means when viewed at a right angle to the direction of Figs. 2 and 3;

Fig. 5 is an enlarged detail view showing parts of the apparatus;

Fig. 6 is a section through the indicator housing showing the indicator therein, the section being taken on the line 6—6 of Fig. 4, and Fig. 7 is an elevation of the indicator housing with a portion of the indicator visible through the sight opening.

Similar reference numerals throughout the several views indicate the same parts.

The invention is herein disclosed with particular reference to photographic apparatus of the type in which a roll of sensitized sheet material is provided, successive portions of the roll being unwound, exposed, and then severed from the roll. The severed sheets are then placed in position to be picked up by suitable conveying means and carried through developing and fixing baths. In the present instance, the invention is illustrated as being constructed to indicate the presence or absence of one of the severed sheets in the holding means in which it is placed to await being picked up by the conveying means. It is obvious, however, that the invention is not limited to such a use, but may be employed to indicate the presence or absence of sheet material at various other points in the same apparatus, or may be used equally well in photographic apparatus of widely different forms.

In Fig. 1 there is shown a side elevation of one form of photographic apparatus including a suitable supporting frame 11 on which may be mounted parts of a camera 12. The papers or other articles to be copied may be supported by means such as the copyholder 13, a prism 14 being provided to bend the rays of light coming from the copyholder so that they will pass along the axis of the camera.

Within the camera there may be mounted a roll of sensitized sheet material 15, portions of which may be successively unwound and placed in the position 16 in the focal plane of the camera so that they may be exposed.

Suitable means such as the knife 17, shown in Figs. 2 and 3, may be used to sever the exposed portion of the sheet material after it has been fed forward so as to bring a fresh unexposed portion into the focal plane. The severed sheets then drop downwardly into suitable holding means such as a chute having a front wall 18 and a rear wall 19, as shown in Figs. 2 and 3.

A sheet held in this holding means or chute is then picked up by suitable conveying means and taken to any desired point. In the present instance, the conveying means may comprise a pair of laterally spaced continuous members such as the chains 20, shown in Fig. 1 and partially shown in Figs. 2 and 3. Suitable pick-up means may be attached to these chains 20, this pick-up means in the present instance comprising a plurality of pin bars 21, each bar having one of its ends attached to one chain 20, and the other end attached to the other chain, so that each bar extends across from one chain to the other. Each bar may carry a plurality of pins or darts 22 extending forwardly in the direction of travel of the conveyor. In Fig. 3 one of the pin bars is shown approaching the sheet holding means or chute, and it is apparent that when the forward movement of the conveyer continues, the pins or darts 22 will pierce the sheet 25 resting in the holding means and will thus pick up the sheet, draw it out of the holding means, and carry it away.

The path of travel of the conveyor after it picks up the sheets may lead to any desired point. In the present instance, as is indicated diagrammatically in Fig. 1, the conveyor travels through a tank 26 which has various compartments containing developing, fixing, and washing solutions, so that the sheet is developed and fixed during its travel. It may be removed from the conveyer at any desired point in the travel, means preferably being provided for automatically removing the sheet when it is over the tank 27, so that it will drop into this tank and may be taken therefrom when desired by the operator.

The conveyor 20 may be driven in any desired manner such as by the motor 28. Suitable conduits such as 29, 30, and 31 may be associated with the various liquid tanks. These features form no part of the present invention and detailed description of them is therefore unnecessary.

From the general features of the apparatus which have been described above, it is apparent that if two sheets occupy the sheet holding means or chute at the same time, they will both be picked up together by the next pick-up means or pin bar which travels past the chute. This is undesirable, since one of the sheets may be imperfectly developed and fixed. For this reason, indicating means may be provided for showing the operator of the apparatus that a sheet is occupying the holding means or chute. When the operator knows that a sheet is in the chute and has not yet been picked up, he will know that he should not sever another sheet and drop it into the chute until the sheet already there has been picked up and removed. The indicating means herein disclosed will accomplish this purpose of showing the operator whether or not a sheet occupies the holding means.

Furthermore, in the continued operation of the apparatus, it may happen that the roll of sheet material is exhausted without the operator becoming aware of that fact. The operator may go through the motions of making exposures, yet no prints will result if the sheet material is used up. Such a procedure obviously involves a waste of time, and it is therefore desirable to provide some means for indicating to the operator that the sheet material has been consumed, so that he will not have to wait until the finished prints are taken from the machine in order to ascertain whether the supply of sheet material held out until the last exposure was made.

The indicating means provided according to the present invention may be used to warn the operator of the exhaustion of the supply of sheet material, and thus it performs both of the desirable indications mentioned above. When the sheet material has been used up, it is obvious that operation of the means for feeding the material and of the severing knife 17 will not result in placing a sheet within the holding chute, since there is no sheet available to be placed therein. Therefore, if the indicator is arranged to show the presence or absence of a sheet in this chute, the operator may glance at the indicator after each manipulation of the feeding means and severing knife, and if the indicator then shows that no sheet occupies the chute, he will know that the supply of sheet material has been used up and that a new supply must be inserted in the machine.

One possible form of indicator for accomplishing these purposes may comprise a shaft 35 extending transversely across the chamber in which the sheet holding chute 18—19 is placed. This shaft may extend at one end through the right hand side wall 36 of the chamber, as shown in Fig. 4, and the other end of the shaft may be journalled on a pin 37 attached to the screw 38, which passes through the left hand side wall 39 of the chamber.

In any convenient position, such as near the center of the chamber, a collar 40 may be fixed on the shaft 35 by means such as the set screw 41, and this collar may carry a downwardly extending arm 42 bent rearwardly at 43 and bent again forwardly at 44, as best shown in Figs. 2, 3, and 5.

A slot 46 may be formed in the front wall 18 of the chute, and another slot 47 in the rear wall, these slots being so placed that the rearward bend or nose on the arm 42 may extend through them as illustrated in Fig. 2. The arm 42 is constructed of stiff but light material such as wire, and an arm 50 attached to the collar 40 carries a counterweight 51 adjustably held on the arm by a set screw 52. The counterweight is preferably adjustable to such a position that it tends to move the nose of the arm 42 rearwardly into the slots 46 and 47 with a slight force insufficient to displace a piece of sheet material which might occupy the chute and interfere with such movement.

It is obvious from the foregoing description that when there is no sheet within the chute, the arm 42 will occupy the position shown in Fig. 2. When a sheet is within the holding chute, however, the arm 42 will be displaced to the position shown in Fig. 3, and thus the shaft 35 will be rotated a slight amount. If means be provided observable from the outside of the casing for indicating this partial rotation of the shaft 35, it is obvious that this indicating means would show whether or not a sheet is held in the chute, and thus the desirable results set forth above would be attained.

To provide this indication of the rotation of the shaft 35, the end of this shaft which projects outside of the casing may have fixed thereto a collar 60 from which an arm 61 depends, the lower end of this arm carrying a target or indicating device 62, as best shown in Figs. 4 and 6. A casing 63 is placed on the outer side of the wall 36 of the chamber, this casing completely enclosing the end of the shaft 35 and the collar 60, arm 61, and target 62 mounted thereon, except for a slight opening 65 formed in the casing through which the target 62 may be observed when it is in predetermined position.

Obviously the sight opening may be placed in such position that the target will register with the opening when the sheet-controlled arm 42 is in either of its positions, and will be out of registration therewith when the arm is in its other position. In the present instance, the target 62 is arranged to show through the opening 65 when the arm 42 is in the position shown in Fig. 2, and to be masked or hidden from view when the arm 42 is in the position illustrated in Fig. 3. Thus an indication or registration denoting the absence of a sheet from the chute is furnished when the target 62 is visible, and when the target can not be seen, this indicates or registers the fact a sheet is within the chute. Preferably the target is made of a color which contrasts with the color of the casing 63 and with the color visible through the opening 65 when the target is out of alinement therewith, so that an indication of one color is plainly visible when the indicating means is in one position, and an indication of contrasting color is seen when the means is in another position.

Since the shaft 35 must be able to rotate without excessive friction in order that it may be sufficiently sensitive to show the presence or absence of a sheet, it follows that the bearing of the shaft in the side wall 36 of the chamber must not be too tight, or friction at this point will interfere with the turning of the shaft. If a tight bearing is not used, there is a possibility of slight leakage of light into the chamber around the shaft, and such leakage would be undesirable because of the fact that the chamber contains sensitized material which might become fogged or otherwise damaged by the leakage of light. It is to prevent such a leak that the casing 63 above mentioned, is provided. It will be noted that the only opening through which light may enter this casing 63 is the small sight opening 65. Since this sight opening is offset a substantial distance from the point where the shaft 35 passes throught the wall 36 of the chamber, it follows that leakage of light into the chamber is prevented.

Thus it will be seen that indicating means is provided for registering at a point outside of the chamber certain conditions which exist within the chamber. At the same time, means is also provided for preventing leakage of light into the chamber at the point where the indicating means passes through the wall thereof.

In use, the operator of the apparatus glances at the sight opening 65 prior to initiating a feeding and severing operation. Since the casing 63 containing the sight opening 65 is conveniently placed on the side of the apparatus adjacent the controls, as shown in Fig. 1, it is easy for the operator to observe the indicator at a glance without loss of time.

If the operator sees the target 62 through the sight opening, he knows that there is no sheet within the holding chute, and he therefore knows that he may feed the sheet material forwardly and sever a sheet, allowing it to drop into the chute. On the other hand, if the target 62 is out of registry with the sight opening 65, so that the operator is unable to see the target, he knows that a sheet is in the chute and that he must wait until the next pin bar 21 travels past the chute and picks up the sheet, before he severs the next sheet and allows it to fall into the chute.

After completing the feeding and severing operation, and before a sheet dropped into the chute has had time to be picked up and withdrawn by the next pin bar, the operator may again glance at the indicator. If the target can not be seen through the sight opening, the operator knows that a sheet has been dropped into the chute, and that the supply of sheet material is not exhausted. If the target is visible at this time, however, the operator is thereby informed that no sheet was placed in the chute as a result of the last operation of the severing means, and he therefore knows that the supply of sensitized material must have been used up. Consequently, he takes steps to put a fresh roll of material in the machine, and he makes another exposure of the same papers or other articles to be copied, knowing that no sheet of material was present in the focal plane during the last previous exposure.

It will be seen that the indicating means herein disclosed is simple and effective, and that it may be easily and cheaply constructed and installed. Furthermore, it may be applied to existing machines as well as to photographic apparatus hereafter built.

While one embodiment of the invention has been disclosed, it is to be understood that the inventive idea may be carried out in a number of ways. This application is therefore not to be limited to the precise details shown, but is intended to cover all variations and modifications thereof falling within the spirit of the invention or the scope of the appended claims.

I claim as my invention:

1. In a photographic apparatus, the combination with a chamber, of means for holding a sensitized sheet therein, a shaft within said chamber and having one end extending through a side wall thereof, an arm on said shaft, means tending to move said arm across the path occupied by a sheet held in said holding means and permitting displacement of said arm by a sheet, and an indicator connected to the end of said shaft outside of said chamber, said indicator being movable in accordance with movements of said arm and thereby registering the presence or abscence of a sheet in said holding means.

2. In a photographic apparatus, the combination with a chamber, of means for holding a sensitized sheet therein, a shaft within said chamber and having one end extending through a side wall thereof, an arm on said shaft, means tending to move said arm across the path occupied by a sheet held in said holding means and permitting displacement of said arm by a sheet, a casing on the outer side of said wall covering the projecting end of said shaft, an indicator within said casing connected to said shaft, and a sight opening in said casing for viewing said indicator, said sight opening being offset a substantial distance from said shaft to prevent light from said opening from leaking into said chamber around said shaft.

3. In a photographic apparatus, the combination with a chamber, of a chute within said chamber for holding an exposed sheet of sensitized material, a shaft within said chamber and having one end extending through a side wall thereof, one wall of said chute having an opening, an arm on said shaft having a portion adapted to extend through said opening into said chute, means tending to move said portion into said chute and permitting displacement thereof by a sheet within the chute, an indicator mounted on the projecting end of said shaft outside of said chamber, and means preventing leakage of light into said chamber where said shaft passes through the wall thereof.

4. In a photographic apparatus, the combination with a dark chamber, of means for holding a sensitized sheet therein, said holding means including a pair of spaced walls arranged to hold a sheet between them, one of said walls having an opening therein, an arm mounted for movement through said opening to test the presence or absence of a sheet in said holding means, counter weight means tending to move said arm through said opening into a position across the space between said walls, said counter weight means being adjustable to vary the force tending to move said arm, and means for indicating the position of said arm at a point exterior of said dark chamber.

5. In a photographic apparatus, the combination with a dark chamber, of means for holding a sensitized sheet therein, and indicating means for registering the presence or absence of a sheet in said holding means, said indicating means including means for giving an indication of one color when a sheet is present and an indication of a contrasting color when a sheet is absent.

6. In a photographic apparatus, the combination with a dark chamber, of means for holding a sensitized sheet therein, and indicating means for registering the presence or absence of a sheet in said holding means, said indicating means including a member displaceable by a sheet within said holding means and a movable member connected to said displaceable member for causing an indication of one color when a sheet is present and an indication of a contrasting color when a sheet is absent.

7. In a photographic apparatus, the combination with a dark chamber, of means for holding a sensitized sheet therein, conveyor means for withdrawing a sheet from said holding means, and indicating means for registering the presence or absence of a sheet in said holding means, to show whether or not said conveyor means has withdrawn a sheet herefrom.

8. In a photographic apparatus, the combination with two spaced members for receiving a sheet of sensitized material between them and having an aperture in one of said members, of a feeler movable through said aperture into the space between said members in a direction transverse to a sheet received therein, and indicating mechanism controlled by the position of said feeler for indicating the presence or absence of a sheet between said spaced members.

9. In a photographic apparatus, the combination with two spaced members for receiving a sheet of sensitized material between them and having an aperture in each of said members, of a movable feeler biased to tend to move through said apertures and to extend across the space between said spaced members and displaceable by a sheet inserted in said space, and indicating mechanism controlled by the position of said feeler for indicating the presence or absence of a sheet between said spaced members.

10. In a photographic apparatus, the combination with a dark chamber, of a sensitized sheet holding chute comprising two spaced plates and having an aperture in one of said plates, means for inserting a sheet of sensitized material into the space between said plates, a movable feeler tending to extend through said aperture and across the space between said plates and arranged to be displaced by insertion of a sheet in said space, and indicating mechanism controlled by the position of said feeler for indicating at a point exteriorly of said dark chamber the presence or absence of a sheet within said chute.

11. In a photographic apparatus, the combination with two spaced members for receiving a sheet of sensitized material between them, means for inserting a sheet of sensitized material into the space between said members, a feeler tending to extend transversely across said space and displaceable transversely by insertion of a sheet through a distance substantially greater than the thickness of the inserted sheet, and indicating mechanism controlled by said feeler for indicating at a point exteriorly of said spaced members the presence or absence of a sheet between said members.

ARTHUR W. CAPS.